April 28, 1925.

P. L. LARSEN ET AL

STONE GATHERING MACHINE

Filed Oct. 31, 1923   2 Sheets-Sheet 1

P. L. Larsen.
J. O. Ellis.
INVENTOR

BY Victor J. Evans.
ATTORNEY

WITNESS:

April 28, 1925.
P. L. LARSEN ET AL
STONE GATHERING MACHINE
Filed Oct. 31, 1923   2 Sheets-Sheet 2
1,535,321
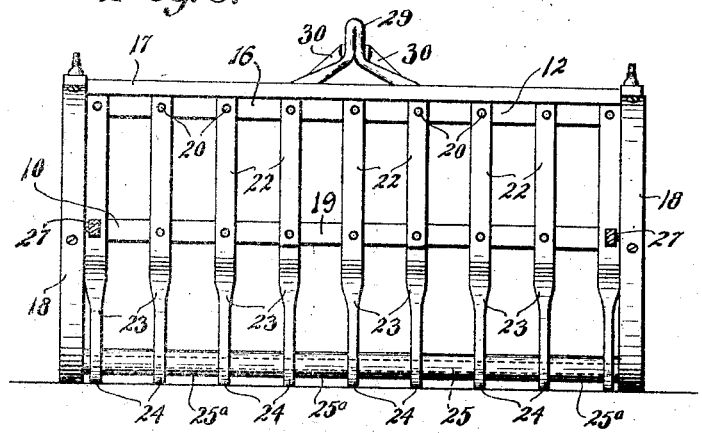
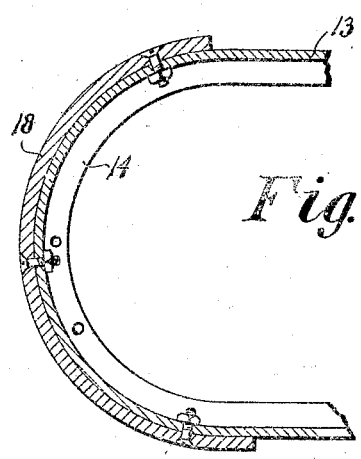
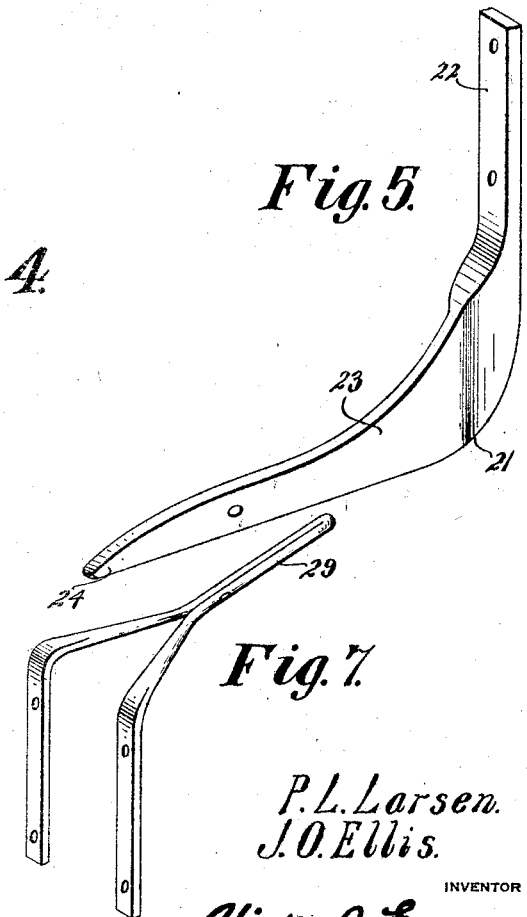
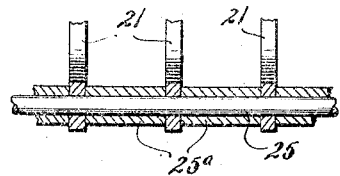
P. L. Larsen.
J. O. Ellis.
INVENTOR Patented Apr. 28, 1925.

1,535,321

UNITED STATES PATENT OFFICE.

PETER L. LARSEN AND JAMES O. ELLIS, OF PAUL, IDAHO, ASSIGNOR OF ONE-NINTH TO EDDIE McDONALD AND TWO-NINTHS TO LESTER G. TAYLOR, BOTH OF PAUL, IDAHO.

STONE-GATHERING MACHINE.

Application filed October 31, 1923. Serial No. 672,031.

*To all whom it may concern:*

Be it known that we, PETER L. LARSEN and JAMES O. ELLIS, citizens of the United States, residing at Paul, in the county of Minidoka and State of Idaho, have invented new and useful Improvements in Stone-Gathering Machines, of which the following is a specification.

This invention relates to devices for use on roads, plowed ground and the like for working upon the same, and has for its object the provision of a novel device for handling cobble stones, small boulders and the like whereby they may be gathered or conveyed depending upon the use to which the machine is put, means being provided for effecting dumping when such is desired.

An important object and a more specific one, is the provision of a basket like or cage like device for this purpose which is designed to be pulled along over the ground and which includes a plurality of teeth which act as shoes for traveling along the ground, the device further being equipped with runners having shoes which are removable and replaceable in case of wear.

An additional object is the provision of a device of this character which will be simple and inexpensive in manufacture, highly efficient in use, durable in service and a general improvement in the art.

Figure 1:
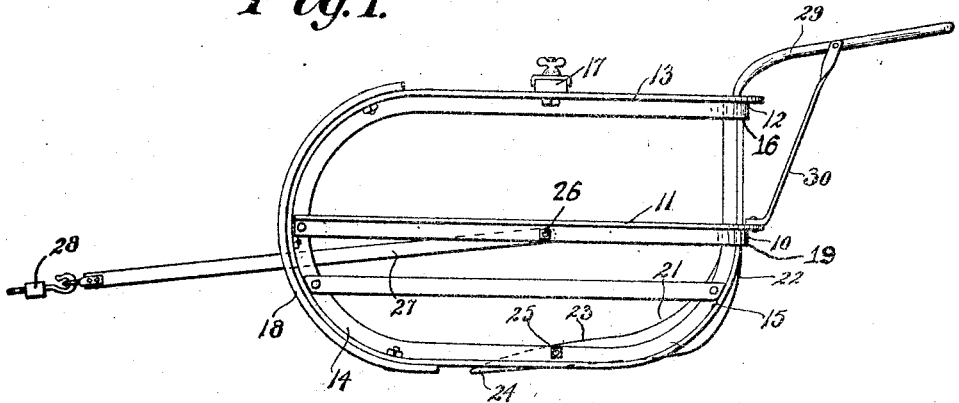
Figure 2:
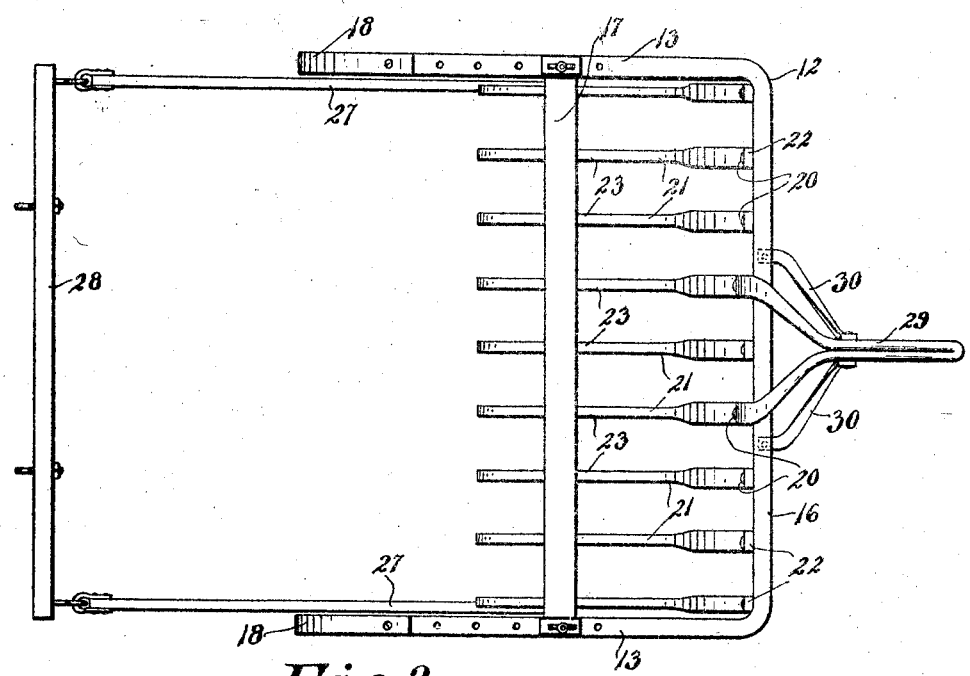

With the above and other objects and advantages in view the invention consists in the details of construction to be hereinafter more fully described and claimed and illustrated in the accompanying drawings, in which:

Figure 1 is a side elevation of the device,
Figure 2 is a plan view thereof,
Figure 3 is a front elevation,
Figure 4 is a detail section showing the mounting for the removable shoes,
Figure 5 is a perspective view of one of the teeth.

The remaining figures are detail views.

Referring more particularly to the drawings I have shown the device as comprising a horizontal U-shaped main bar 10 which has its arms 11 forming a part of the sides or ends of the device. The numeral 12 designates a U-shaped upper bar which has its arms 13 curved downwardly and rearwardly as shown at 14 and then brought upwardly as shown at 15 and secured to the arms 13 near the juncture thereof with the bight portion 16. Secured upon the arms 13 near the downward curve thereof is a floating bar 17 which operates to brace the structure and hold the sides or ends in proper spaced relation.

The curved forward ends of the sides of the device constitute runners and to avoid excessive wear thereon, we provide arcuate shoes 18 which are removably secured upon the runners by any desired means and which may be easily replaced when worn out.

Secured to the bight portion 16 of the upper bar 12 and the bight portion 19 of the main bar 10, by means of bolts 20 or other equivalent means, are teeth designated broadly by the numeral 21, which teeth include upright shanks 22 and forwardly curved ends 23 which also travel along the surface of the ground traveled over. The forward ends of these teeth are preferably pointed as indicated at 24 so as not to catch against a rock or boulder but to slip therefrom. These teeth are comparatively thick and heavy so as to withstand the hard usage to which they are subjected in practice. For strengthening purposes, we provide a rod 25 which passes through all of the teeth 21 and which is bolted, riveted or otherwise secured to the runners. On the rod are sleeves 25$^a$ disposed between the successive teeth for maintaining them in proper spaced relation. Pivoted at 26 upon the sides of the device are draft links 27 which are connected with a suitable evener 28 to which any desired number of draft animals may be hitched, though it should be understood that a tractor or other vehicle might be the propelling means if desired.

For effecting dumping when such is desired, we provide a curved and forked bar 29 which extends upwardly and rearwardly and which is bolted or otherwise secured to the bight portions 16 and 19 of the bars. If necessary this bar may be strengthened by inclined braces 30 arranged as shown.

In use the device is drawn along the road or upon plowed ground or any other surface from which it is desired to gather large loose stones. The teeth will engage beneath the stones and dislodge them from their resting places so that they will be gathered into the basket or cage like structure and be readily transported to the desired place. Of course the device may also be used as a carrier for transporting stones for use in filling in mud holes and the like on a highway or may be used for other purposes, there being no limitation in this respect. When desired, dumping is effected very simply by grasping the bar 29 and swinging the device forwardly while it is being pulled whereupon it will be inverted and will discharge its contents.

From the foregoing description and a study of the drawings it will be apparent that we have thus provided a simple, inexpensive and highly efficient device for the purpose specified which on account of its simplicity has nothing to get out of order.

While we have shown and described the preferred embodiment of our invention it is of course to be understood that we reserve the right to make such changes in the form, construction and arrangement of parts as will not depart from the spirit of the invention or the scope of the subjoined claims.

We claim:

1. A device of the character described comprising upper and lower frame bars of U-shape, the arms of the upper bar being bent downwardly and rearwardly and secured to define runners, draft links connected with the runners, an evener connected with the draft links, a transverse bar connecting said curved arms, a hand lever connected with the bars for dumping the device, and a plurality of teeth secured to the bight portions of said bars and extending forwardly with their lower surfaces traveling along the ground.

2. A device of the character described comprising upper and lower frame bars of U-shape, the arms of the upper bar being bent downwardly and rearwardly and secured to define runners, draft links connected with the runners, an evener connected with the draft links, a transverse bar connecting said curved arms, a hand lever connected with the bars for dumping the device, and a plurality of teeth secured to the bight portions of said bars and extending forwardly with their lower surfaces traveling along the ground, a transverse rod passing through all of said teeth for bracing them, spacing sleeves on said rod between the successive teeth.

3. A device of the character described comprising upper and lower frame bars of U-shape, the arms of the upper bar being bent downwardly and rearwardly and secured to define runners, draft links connected with the runners, an evener connected with the draft links, a transverse bar connecting said curved arms, a hand lever connected with the bars for dumping the device, and a plurality of teeth secured to the bight portions of said bars and extending forwardly with their lower surfaces traveling along the ground, and shoes detachably mounted upon the runners for taking up wear, the shoes being replaceable when worn.

In testimony whereof we affix our signatures.

PETER L. LARSEN.
JAMES O. ELLIS.